Aug. 7, 1962 W. G. PAIGE 3,048,246
INTERMITTENT STEP DRIVEN CLUTCH MECHANISM
Original Filed Dec. 21, 1954 6 Sheets-Sheet 2

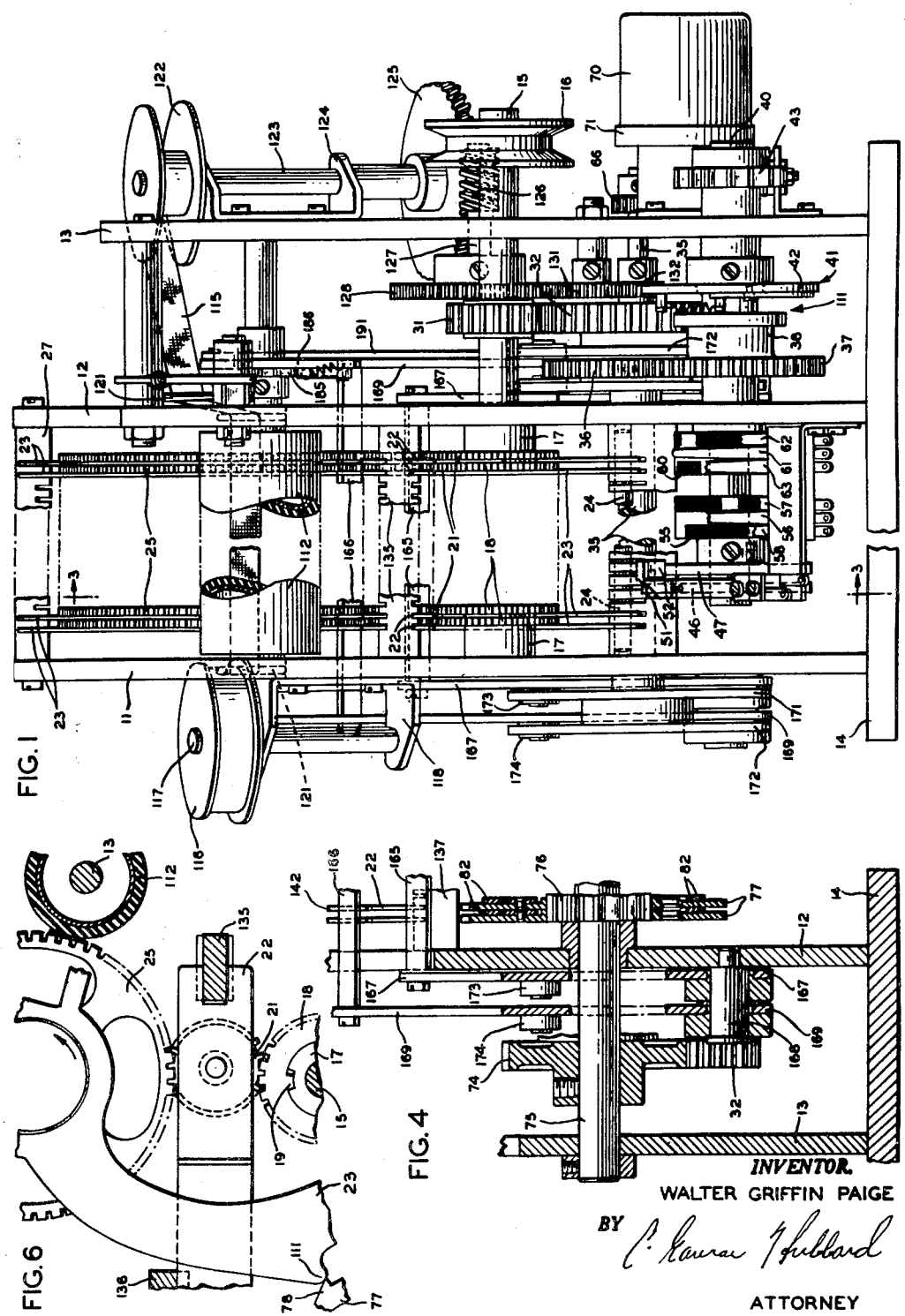

INVENTOR.
WALTER GRIFFIN PAIGE
BY
ATTORNEY

Aug. 7, 1962 W. G. PAIGE 3,048,246
INTERMITTENT STEP DRIVEN CLUTCH MECHANISM
Original Filed Dec. 21, 1954 6 Sheets-Sheet 3

INVENTOR.
WALTER GRIFFIN PAIGE
BY
ATTORNEY

INVENTOR.
WALTER GRIFFIN PAIGE

Aug. 7, 1962 W. G. PAIGE 3,048,246
INTERMITTENT STEP DRIVEN CLUTCH MECHANISM
Original Filed Dec. 21, 1954 6 Sheets-Sheet 5

*INVENTOR.*
WALTER GRIFFIN PAIGE
BY
ATTORNEY

Aug. 7, 1962 W. G. PAIGE 3,048,246
INTERMITTENT STEP DRIVEN CLUTCH MECHANISM
Original Filed Dec. 21, 1954 6 Sheets-Sheet 6

INVENTOR.
WALTER GRIFFIN PAIGE
BY
ATTORNEY

United States Patent Office 3,048,246
Patented Aug. 7, 1962

3,048,246
INTERMITTENT STEP DRIVEN CLUTCH MECHANISM
Walter Griffin Paige, Norwalk, Conn., assignor, by mesne assignments, to Sperry Rand Corporation, New York, N.Y., a corporation of Delaware
Original application Dec. 21, 1954, Ser. No. 476,803, now Patent No. 2,869,457, dated Jan. 20, 1959. Divided and this application Jan. 15, 1959, Ser. No. 791,786
4 Claims. (Cl. 192—33)

This invention relates generally to clutch mechanisms and has more particular reference to a clutch for providing a step motion of predetermined extent to the driven members of the device at any selected one of a plurality of periods of an operating cycle.

The device is particularly adaptable for use in business machines of various types and is disclosed herein in an embodiment utilized for effecting the firing of type wheels of a card controlled printing mechanism such as disclosed in my prior application S.N. 476,803, filed December 21, 1954, and entitled "Rotary Printing Means," now U.S. Patent 2,869,457, this application being a division of the aforesaid prior application.

Generally stated, the clutch mechanism comprises a driven member which in the present embodiment is in the form of a cam disk mounted centrically to the driving member which is in this embodiment is in the form of a toothed sleeve, said disk carrying a pawl for effecting a positive driving engagement between the driving and driven members. Said pawl is cam actuated into and out of engagement by a cam ring member which is released and restored by a trip mechanism electromechanically controlled. The mechanism is self disengaging so as to provide only a predetermined amount of driving motion regardless of variations in the release time of the controlling electro-mechanical actuator. The design of the mechanism is such as to permit the part to be embraced within only two layers or thicknesses of metal thereby permitting its use in equipment wherein the available space widthwise would preclude the use of clutch mechanism having a less compact design.

It is an object of this invention to provide an improved clutch mechanism for intermittently operating a driven member.

It is a further object to provide a clutch mechanism wherein cam action is utilized for both engaging and disengaging a driven member with the driving member.

It is a further object of the invention to provide a clutch mechanism with improved means for self disengagement.

It is still a further object of the invention to reduce to a minimum the lateral dimension of clutch mechanism of the character described.

Other objects and structural details of the invention will be apparent from the following description when read in connection with the accompanying drawing, wherein FIG. 1 is a view in rear elevation of the mechanism;

FIG. 4 is a sectional view of a portion of the drive mechanism taken along lines 4—4 of FIG. 2;

FIG. 6 is a sectional detail view showing the type wheel and associated driving gear at the completion of a printing stroke;

Figure 7:
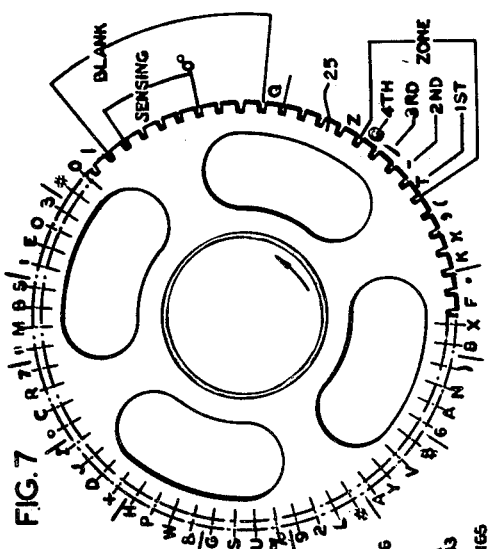
FIG. 7 is a detail view of a type wheel illustrating the arrangement of type characters thereon.

The invention is hereby disclosed and described in an embodiment adapted for a punched card machine, such as a tabulator although the invention is not to be limited to the exact form or application thereof shown herein.

A punched card tabulator nominally comprises a plurality of differentially settable type carriers, each carrier being under control of an item of data contained in the corresponding column of a record card. In such a machine, the type carriers will correspond in number to at least the number of columns contained in the record card and may be greater in number than the number of columns contained in the record card.

As may be seen in FIG. 1, which is a rear view, the printing mechanism of the invention is supported by a right-hand frame plate 11 and a left-hand frame plate 12, the main drive gearing being supported by and between the plate 12 and an outwardly disposed auxiliary frame plate 13. Each of said upright frame plates are suitably secured to a base frame 14. A main drive shaft 15, journaled in said upright frame plates and provided with a pulley 16 for driving connection with a suitable source of power, carries a hub or sleeve 17 fast on said shaft and extending between the frame plates 11 and 12. A drive gear 18, of which there is one for each print member, loose on the gear hub 17, has an ear 19 (FIG. 3) formed off the inner circumference thereof for engagement with a keyway cut in said gear hub sleeves. Construction is such that slight angular clearance is provided between the ear 19 and the keyway for reasons hereinafter mentioned.

An idler gear 21, one for each drive gear 18, is rotatably supported on an individual gear carrying slide member 22. The slides 22 are actuable to one of four lateral positions and are restored to a normal for "first" position by means described hereinafter.

Figure 3:
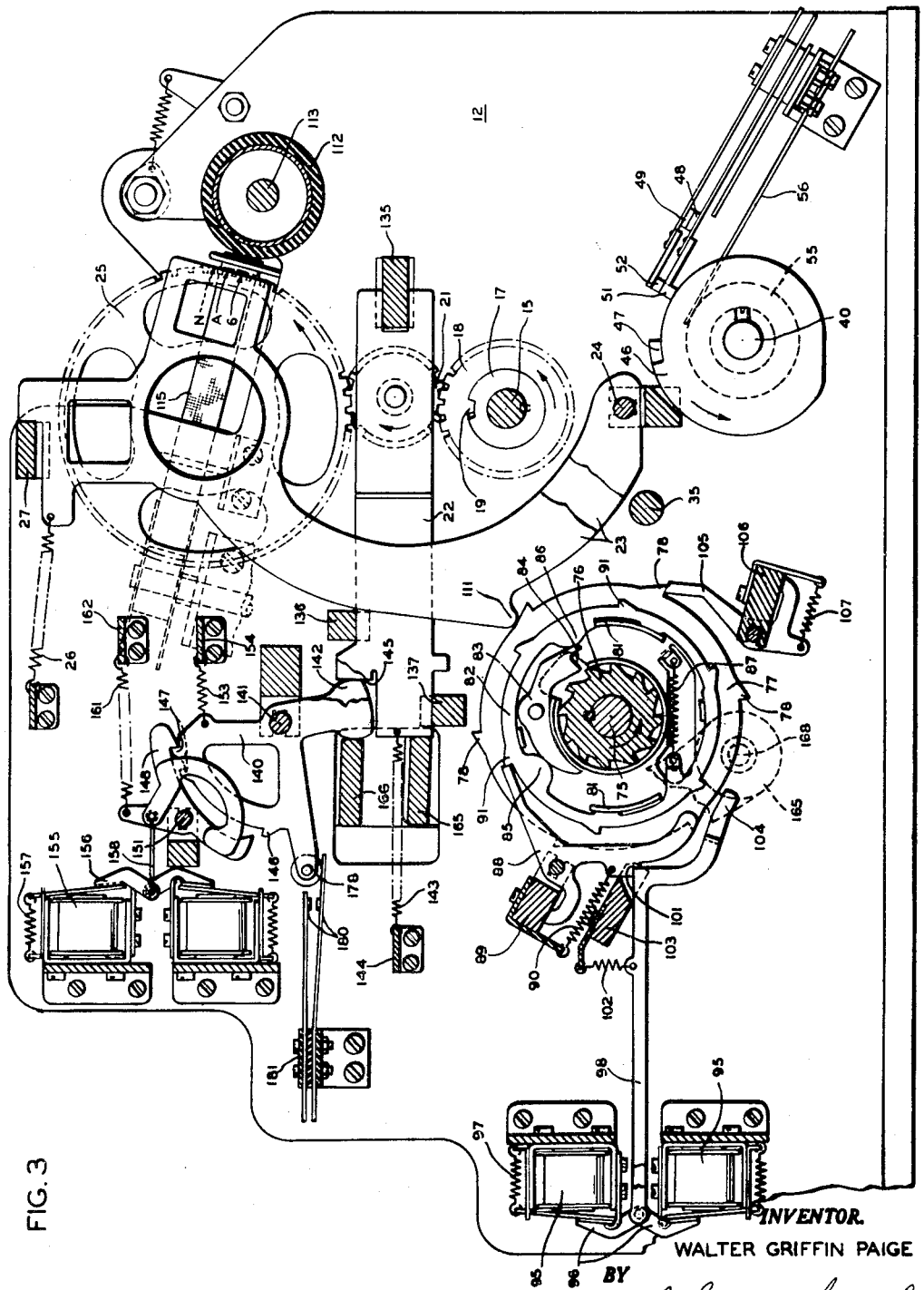
FIG. 3 is a sectional view taken along the lines 3—3 of FIG. 1.

Type wheel carriers 23, pivotally supported by a cross rod 24, each have a type wheel 25 pivotally mounted near the upper end thereof. A spring 26 serves to urge the carrier arm 23 leftward, as seen in FIG. 3, to a normal non-print position. Said carrier arms are guided in a transverse comb 27 and are rocked rightward momentarily to a print position by suitable control means, described hereinafter, for the purpose of printing a desired character formed on the outer periphery of the type wheel on teeth which are shaped for engagement with the gear teeth of the idler gear 21. The number of teeth on the type wheel is determined by the total number of characters that it is desired to print, allowing one such character for each of said teeth, there being an additional number of blank teeth necessitated by inherent operational characteristics of the mechanism herein disclosed. In the present instance, the type wheel is provided with sixty-four teeth as follows: fifty-three teeth provided with characters for printing, three unused teeth which may be used for additional printing capacity, and eight blank teeth to permit sufficient time interval for inherent mechanism functions. Each character is formed on the outer periphery of a respective one of the type wheel teeth, and relative character location on the type wheel in the present instance is shown in FIG. 7.

The main drive shaft 15 is driven by suitable means during machine operation such that the motion of the gear train formed by the drive gear 18, the idler gear 21, and the type wheel 25 causes rotation of said type wheel in timed relation to the machine operating cycle. In the case of a card controlled tabulator, the main drive shaft 15 is operated to cause the type wheel to rotate once during each sensing cycle.

A main drive gear 31, fast on the main drive shaft 15, meshes with a drive gear 32 (see also FIG. 5) fast on a hub 33 keyed to a drive shaft 35, said drive shaft being journaled in the frame members 12 and 13. A gear 36, fast on the hub 33, meshes with a timing gear 37, having a gear hub 38 loose on a timing shaft 40, also journaled in the frame members 12 and 13.

Figure 2:
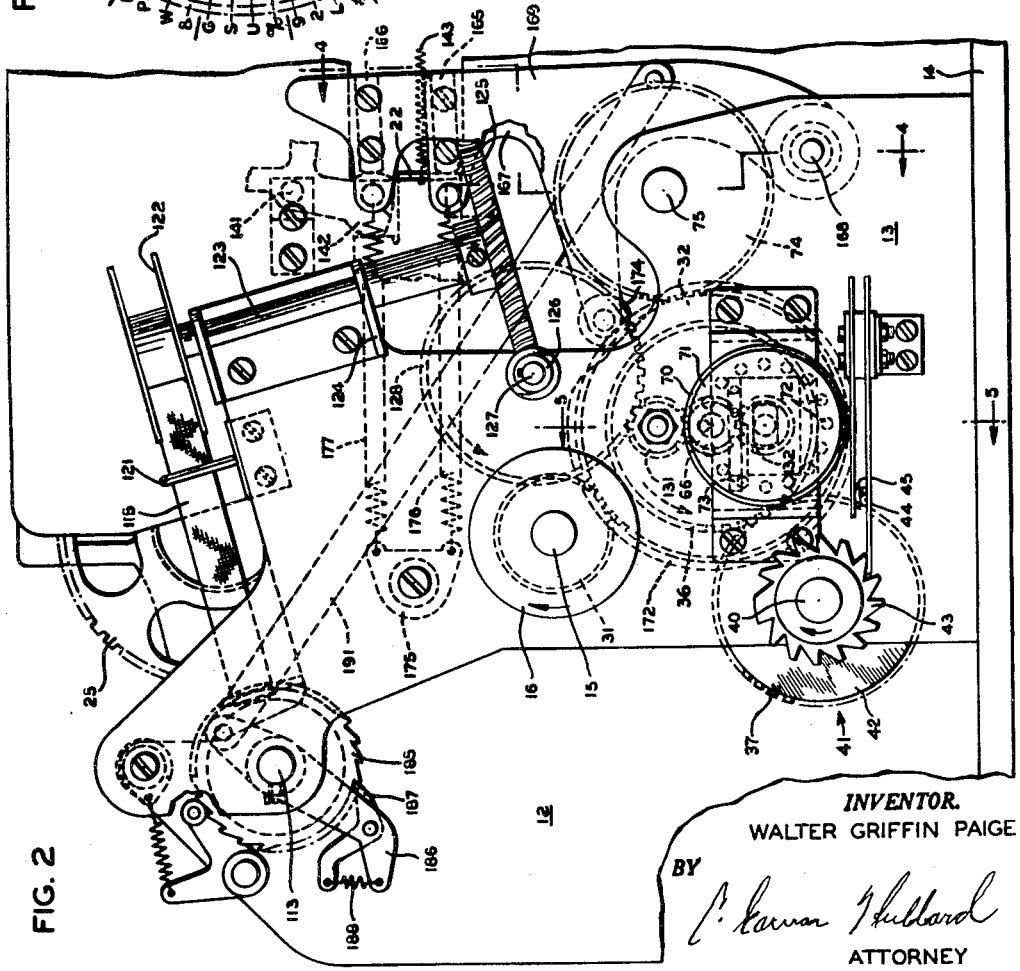
FIG. 2 is a view in side elevation taken from the left hand side of the machine.

A unidirectional clutch mechanism, indicated generally at 41, and including a clutch disc 42 fast on said shaft serves to transmit motion of the timing gear 37 to the timing shaft 40 only when said timing gear turns in its normal direction of rotation, which is to say, clockwise, as seen in FIG. 2. The timing gear 37 will move in idle motion relative to the timing shaft when turned in opposite direction. Provision of this feature prevents damage to components fast on said timing shaft in event said timing gear is turned in opposite direction.

The gear train formed by the main drive gear 31, drive gear 32, gear 36, and timing gear 37 is of proper ratio to provide one rotation of the timing shaft 40 during each revolution of the type wheel.

A toothed wheel 43, fast on the outer end of the timing shaft 40, is associated with a pair of contacts, hereinafter called "cut-off contacts" 44, 45. Fifteen teeth, one of which is of double length provide means for opening said cut-off contacts at corresponding times during normal clockwise rotation of the timing shaft 40, as seen in FIG. 2.

A cam 46 and a cam 47, fast on the other or inner end of the timing shaft 40, as seen in FIG. 3, operate conjugately to actuate a pair of movable contacts, hereinafter called "safety contacts" 48, 49 respectively, operatively associated with said cams. It will be seen that during normal counterclockwise rotation of the cams 46, 47 the safety contacts will remain in closed position during the greater portion of cam rotation. As the cam follower 51, which carries contact 48 passes the step of its respective cam 46, the safety contacts will open. Shortly thereafter, the cam follower 52 which carries contact 49 passes the step of its respective cam 47 and the safety contacts will close. The above action occurs once during each revolution of the timing shaft 40 and near the end of the print cycle.

A commutator, hereinafter called the "interposer commutator" 55, and best seen in FIG. 1, is fast on the timing shaft 40. Said interposer commutator comprises a core of non-conducting material constituting an electrical insulator with a circumferential metallic coating constituting an electrical conductor. A common contact finger 56 is positioned so as to bear on the central or continuous portion of said metallic coating. A contact finger 57 and contact finger 58, to right and to left, respectively, of the common contact finger 56, serve to perform the function of two single-pole single-throw switches, connected to a common source, during rotation of the timing shaft 40.

Another commutator, hereinafter called the transfer commutator 60, is fast on the timing shaft 40 directly adjacent the interposer commutator 55. Construction of said transfer commutator is similar to the interposer commutator, except for the necessary difference in configuration of the metallic coating. A common contact finger 61, and contact fingers 52 and 63 perform the function of two single-pole single-throw switches, connected to a common source, during rotation of the timing shaft 40.

Figure 5:
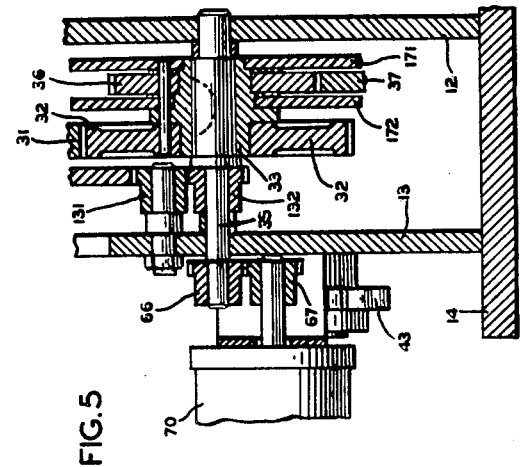
FIG. 5 is a sectional view of another portion of the drive mechanism taken along lines 5—5 of FIG. 2.

A spur gear 66, fast on the outer end of the drive shaft 35 as seen also in FIG. 5, meshes with a spur gear 67, fast on a shaft 68 of a rotary stepping switch 70. Said switch comprises a base plate 71 secured to the frame plate 13 and having sixteen contact pins 72 mounted thereon at equal spaces about a central point and connected in series by resistances of predetermined valves. A contact arm 73, fast on the shaft 68, is driven at the same rate as the type wheel 25 and establishes contact with each of the pins 72 successively during each rotation of said contact arm. The manner in which the various switches and commutators described in the preceding paragraphs function to control printing will be explained in detail hereinafter.

The gear 32, fast on the drive shaft 35, meshes with a clutch drive gear 74 see also FIG. 4, fast on a clutch drive shaft 75, journaled in the frame members 11, 12 and 13. An integral drive member, 76 formed as a sleeve and keyed to the clutch drive shaft, has twelve teeth formed in the outer periphery thereof, as best seen in FIG. 3. Said sleeve forms the driving member of a clutch mechanism, hereinafter called a print cluch of which there is one for each type wheel carrier 23. Major component parts of the print clutch mechanism are described in the paragraphs directly following.

A print cam disc 77, having a cam ear 78 formed off at each of six locations spaced equally about the outer periphery thereof, is rotatably mounted on sleeve 76 so as to be positioned concentric to the axis of rotation of the clutch drive shaft 75, and may be considered to be the driven member of the print clutch mechanism. The rotating sleeve 76 provides a bearing support for each disc 77 which rotates with the sleeve only during clutch engagement. Upstanding lugs 81 formed off the face of the print cam disc 77 serve to position a cam ring 82 concentric to said print cam disc. A pawl 83, pivotally mounted on the print cam disc 77, is rockable to an engaged position wherein a tooth 84 formed in said pawl is caused to engage with one of the twelve teeth of the drive member 76, and to a disengaged position wherein said tooth is held clear of said integral drive member.

Camming lobes 85, 86 extending from the inner circumference of the cam ring 82 are arranged in cooperative relationship with said pawl such that movement of said cam ring in clockwise direction within permissible limits, relative to the print cam disc 77, will cause said pawl to be held in disengaged position. Movement of the cam ring 82 in counterclockwise direction relative to said print cam disc 77 will cause the pawl to move to the engaged position. Suitable lugs extending from the print cam disc 77 and the ring 82 serve to anchor opposite ends of a spring 87 which urges the ring counterclockwise relative to the disc to cause the pawl 83 to engage the sleeve 76. During machine operation, the integral drive sleeve 76 is driven one and one third times the rate of the timing shaft 40 so as to move one tooth space during movement by rotary switch contact arm 73 between adjacent pins 72 of stepping switch 70.

A print release lever 88, pivotally mounted in a comb secured to a transverse bar 89, is urged in clockwise direction by a spring 90. Said print release lever is mounted in such position that the horizontal arm thereof is normally positioned to block the path of any one of six cam lugs 91 extending from the outer periphery of the cam ring 82. Rocking of the print release lever 88 in counterclockwise direction permits relative rotation of said cam ring by spring 87 in counterclockwise direction to engage the pawl 83 with sleeve 76. The vertical arm of said lever 88, upon rotation of the ring when the pawl engages drive sleeve 76, is cammed by a lug 91 to rock the horizontal arm positively into blocking position with respect to the next lug 91 to stretch spring 87 and disengage pawl 83.

An electromagnetic actuator, hereinafter called the print magnet 95, has an armature 96 pivotally mounted thereon. Said armature is held in a normally ineffective position by means of a spring 97, and moves to effective position whenever said print magnet is energized. A trip link 98 has one end pivotally connected to the armature 96. The opposite end of said trip link has a shoulder 101 formed off therefrom, said shoulder being held in contact with a notched recess, formed in the print release lever 88, when said armature and said print release lever are in normal position. A spring 102 urges the trip link in a direction to maintain contact by the link with the associated release lever. A comb secured to a transverse bar 103, holds the parts in vertical alinement.

The lower tail portion 104 of link 98 is disposed, when the link is actuated, for engagement by a cam ear 78 as the cam disc starts to rotate. This camming action on the link 98, which occurs substantially simultaneous with the camming of release lever 88 by a cam lug 91, disengages the link shoulder 101 from the notch of lever 88 to enable said lever to assume its restored blocking position even though the magnet 95 may still be energized. Each time a magnet is energized through a control circuit hereinafter described, the clutch will engage to rotate the cam disc approximately one sixth of a complete rotation. A holding pawl 105, mounted in a comb supported by transverse bar 106, and tensioned by a spring 107 to bear on the cam disc 77, engages behind an ear 78 in ratchet fashion after the disc has been advanced one sixth of a rotation so as to prevent backward clockwise rotation thereof under influence of spring 87 when the clutch pawl 83 disengages the driving sleeve 76.

For purpose of illustrating print clutch operation, it is assumed that the machine is in continuous operation and the position of clutch parts as shown in FIG. 3 is that during an interval when printing is not desired. Briefly, under the stated conditions, the print magnet 95 is in deenergized condition, the cam ring 82 is blocked against rotation by action of the lever 88, the pawl 83 is held in disengaged position, and the spring 87 is in stretched condition. The integral drive member 76 is in motion in counterclockwise direction as seen in FIG. 3.

Figure 12:
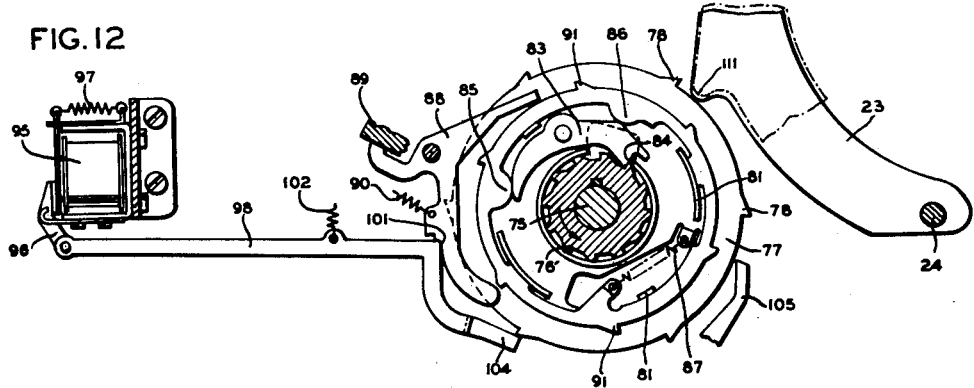

Flow of electrical current in the coil of the print magnet 95 will cause sequence of action as follows: the armature 96 is pulled with consequent movement of the trip link 98 rightward, thus causing the print release lever 88 to rock in counterclockwise direction and to permit rotation of the cam ring 82 in counterclockwise direction. The spring 87 causes rotation of said cam ring relative to the print cam disc 77 with consequent rocking of the pawl 83 from disengaged to engaged position by cooperative action of the cam lobes 85, 86. Said pawl is thereby caused to engage with one of the teeth of the integral drive sleeve 76 and the mentioned parts now assume relative substantially as shown in FIG. 12.

Figure 11:
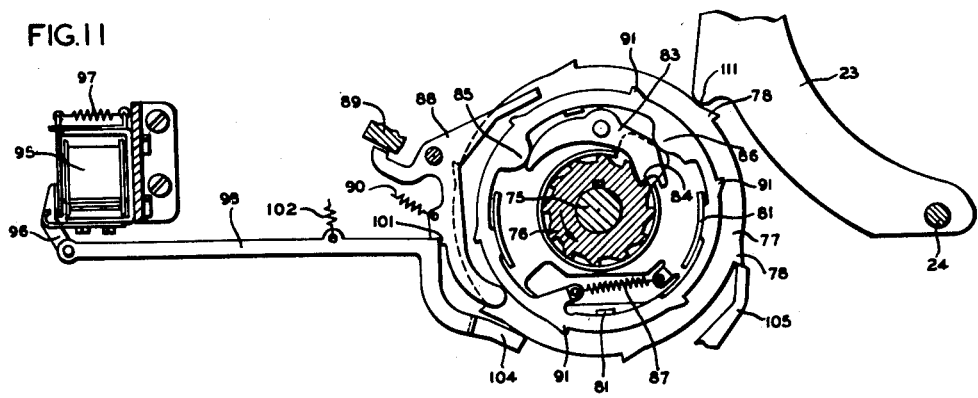
FIGS. 11, 12 and 13 are sectional views of the print actuating clutch in different positions.
Figure 13:
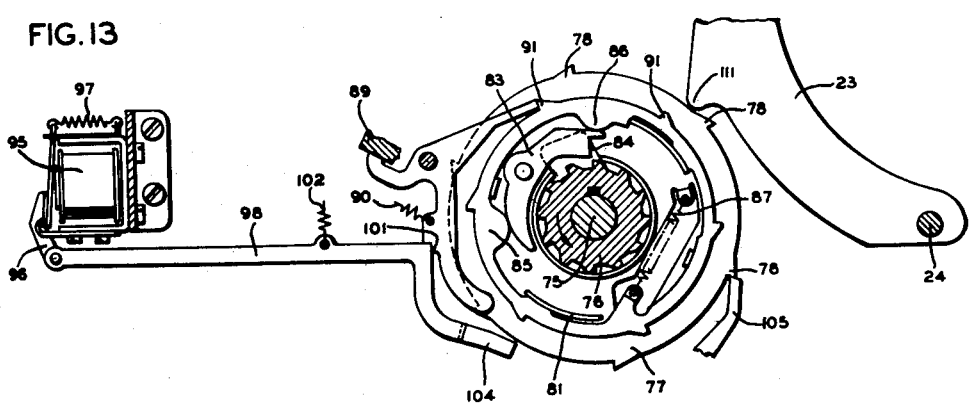

Action as described in the preceding paragraph causes the print cam disc 77 to be driven in counterclockwise direction in synchronism with the integral drive sleeve 76, and the clutch mechanism rotates as a unit as shown in FIG. 13. By comparison of FIG. 11 with FIG. 12, it will be seen that movement of the cam ear 78 closest to the tail 104 formed off from the trip link 98 moves said trip link downwardly in a direction for disengagement of the shoulder 101 from its related recess in the print release lever 88. Such action allows rocking of said print release lever in clockwise direction, which is to say, to normal blocking position, due to movement of the one of six cam lugs 91 closest to the camming arm formed off from the print release lever 88. Action of the spring 102 then restores the trip link 98 to normal position. The clutch mechanism continues to rotate as a unit until the next succeeding cam lug 91 of the cam ring 82 is blocked by the arm of the print release lever 88. At this time, the cam ring is halted, but the print cam disc 77 continues to rotate with the integral drive sleeve 76, thus stretching the spring 87 to extended position. During such stretching, said print cam disc moves relative to said cam ring with consequent rocking of the pawl 83 from engaged to disengaged position by cooperative action of the lobes 85, 86. Said pawl is thereby caused to disengage from said integral drive sleeve at a point whereat the holding pawl 105 is able to engage the next succeeding one of the six cam ears 78 formed off from the print cam disc 77. Clutch parts now assume the position shown in FIG. 13, with the parts again normal but advanced one sixth of a rotation from the position shown in FIG. 3.

Each time the cam disc 77 is stepped, as above described, one of the cam ears 78 thereon will bear against a camming nose 111 formed on the associated type wheel carrier 23 so as to rock said carrier about its pivot 24 in a clockwise direction, as viewed in FIG. 3, and thus move the type wheel 25 against a platen 112 to thereby cause printing of whatever type element may at that time be disposed in printing alignment with said platen. The platen is journaled in the side frame plates 11, 12 by means of a platen shaft 113 and is rotated in a step by step manner for line spacing purposes by mechanism hereinafter described. As heretofore mentioned the type wheel is driven by a constantly rotating gear train including the idler gear 21 and driving gear 18 which cause the type wheel 25 to rotate in a counterclockwise direction. The rocking motion imparted to the type wheel 25 and carrier 23 by the clutch cam disc 77 causes the teeth of the type wheel, which are at that moment enmeshed with the teeth of the idler 21, to shift in the same direction of movement as said enmeshed teeth of the idler so as to in effect momentarily remove the driving torque on the type wheel by said idler gear 21. In this manner the rotation of the type wheel is substantially halted at the moment the type wheel is pressed against the platen 112. The stroke of the carrier 23 and velocity thereof imparted by the cam disc 77 is such as to provide the type wheel 25 with a slightly greater velocity than the surface velocity of the idler 21, so that in the course of the firing stroke of the type wheel all inherent backlash in the respective gear train will be taken up, including the extra play provided by the tooth 19 of the driving gear 18 in the oversized key way of the gear hub sleeve 17 as shown in FIG. 6. Accordingly, at the moment the type wheel is backed up against the platen the rotation thereof will be at a complete standstill, at which time the driving sleeve 17 starts to take up the backlash in the opposite direction, and as the type carrier is restored to its normal position by spring 26 the type wheel rotation will be momentarily accelerated until the normal restored position thereof is reached.

Any suitable means, not shown, may be provided for supporting a web of paper between the platen and the type wheels to receive the imprint as the wheel is fired as above described. Similarly any suitable means may be provided for supporting and feeding imprint transfer means between the paper and the type wheel. In the present instance said transfer means is in the form of an inked ribbon 115 which is wound on a supply spool 116, see also FIG. 1, attached to a spindle 117 supported in a bracket 118 which is secured to the right hand frame plate 11 of the machine. The ribbon is wound around a plurality of guide pegs 121 so as to run longitudinally of the platen to a take up spool 122. Said take up spool is attachable to a spindle 123 supported in a bracket 124 secured to the upright frame plate 13. Secured to the lower end of said spindle is a worm wheel 125 driven by a worm gear 126 journaled in the side frame plate 13. Mounted on the inner end of said shaft 127 is a gear 128 which, as can be seen also in FIG. 2, is driven from the drive shaft 35 through an idler gear 131 journaled in the side frame plate 13 and which meshes with a gear 132 secured to said shaft 35. By this mechanism the ribbon 115 is fed in printing register with platen 112 from the supply spool 116 to the take up spool 122.

It is apparent from the foregoing that the print clutch mechanism will step the cam disc 77 from one cam ear 78 to the next succeeding cam ear in any print cycle in which the print magnet 95 is energized, which action may occur at selected times of a print cycle under control of circuit means hereinafter described.

As heretofore mentioned, each slide 22 is laterally shiftable to one of four positions, which action effects selection of one of four different type chambers of whatever time of the printing cycle the type wheel may be fired, said slides being supported by transverse comb bars 135, 136, 137 secured to the side frame plates 11, 12.

An interposer member 140, pivotally mounted on a rod 141, has a depending arm formed with a lobe 142. A spring 143, one end of which is attached to the slide member 22 and the opposite end of which is attached to an anchor bar 144 seured to the frame plates 11, 12, urges said slide member in leftward direction, as seen in FIG. 3. In this manner, a shoulder 145 formed in the slide member 22 is held in contact with the lobe 142 at all times.

The upper sector shaped portion of the interposer member 140 has escapement teeth formed thereon consisting of a single tooth 146 and a pair of teeth 147 arranged in cooperative relation with an escapement pawl 148, said escapement pawl being pivotally mounted on a pivot rod 151 supported by a transverse comb bar 152 secured to the side frame plates 11, 12.

A spring 153, one end being anchored to a cross bar 154, urges the interposer member in clockwise direction as seen in FIG. 3. An electromagnetic actuator, hereinafter called the interposer magnet 155 has an armature 156 held in a normally deenergized position by means of a spring 157. A link 158 serves to connect the armature to the pivotally mounted escapement pawl 148 which is urged clockwise by a spring 161 having one end anchored to a cross bar 162. Each energization and deenergization of magnet 155 in succession within a print cycle releases the interposer 140 one tooth space to release slide 22 and gear 21 and thereby back up the type wheel 25 one tooth space.

A slide restoring bail bar 165 cooperates with the slide 22 and is actuated to drive said slides to their most rightward or normal position at a certain time during each rotation of the type wheel 25 by mechanism described hereinafter. At the same time, an interposer restoring bail bar 166 cooperates with the lobe 142 of the interposer 140 to drive the interposer to its most counterclockwise position. The normal or restored position of the associated parts mentioned in the foregoing is considered to be that shown in FIG. 3.

The bail bar 165 (FIG. 4) is secured at each end to pivotally mounted lever 167 loose on pivot studs 168 secured to the outer face frame members 11, 12. The bail bar 166 is secured similarly to levers 169, also mounted on the pivot studs 168.

A slide restoring cam 171 and interposer restoring cam 172 (FIG. 5) are fast on the hub 33 keyed to the drive shaft 35. A similar pair of restoring cams are likewise fixed fast to the opposite end of shaft 35 (FIG. 1). An arm formed off from each of said slide restoring levers has a roller 173 mounted to engage cams 171, and a similar roller 174 is mounted on an arm formed off from each of said interposer restoring levers to engage cams 172. A yoke shaped clip 175, pivotally mounted on each of the side frame members 11, 12, serves to anchor one end of each of two springs 176 and 177. The opposite ends of the springs 177 are attached near the upper end of the interposer bail levers 169, and the opposite ends of the springs 176 are attached in similar fashion near the upper end of the slide bail levers 167. Construction is such that the levers 167 and 169 are spring urged in a direction to cause the rollers 173 and 174 to ride on their respective cams 171 and 172.

Accordingly, the restoring bails 165 and 166 will be driven from a releasing leftward position to a rightward restoring position, the position shown in FIG. 3, during each revolution of the drive shaft 35. This action will occur near completion of each revolution of the type wheel 25, for purpose of restoring the interposer member 140 and slide member 22 to their first position in event they had been released to some other position earlier in the print cycle.

As mentioned previously, the type wheels 25 in the present instance are provided with sixty-four teeth. For purpose of description, the teeth are considered as being arranged in zones, each zone having four teeth. The sixteen zones so formed are arranged in sequence on the periphery of said type wheel as seen in FIG. 7. Considering the type wheel to be in normal counterclockwise motion, the normal restored or first position of the slide 22 results in bringing the first tooth, when counted in counterclockwise order, in each zone to a location that would permit printing of the character located on said first tooth in event data representing that character is sensed in the corresponding card column. The normal position of the slide member 22 is regarded as being the first position of this member and the character within each type wheel zone selected by said first position of the slide is regarded as being the first character in each zone, although in fact the last character of the zone to pass by the platen. It follows then that subsequent characters within each zone may be designated according to the slide position permitting their respective selection, even though this order of arrangement of characters within each zone is reverse to the order in which they pass the platen.

In addition to a first position, the escapement member 148 permits movement of the interposer member 140 to one of three additional positions by energization of the escapement magnet 155 in timed impulses, as described directly following.

As seen in FIG. 3, the pawl 148 is engaged with the first tooth 147 of the interposer member 140 when the slide member 22 is in normal restored position and the escapement magnet 155 is deenergized.

Figure 8:
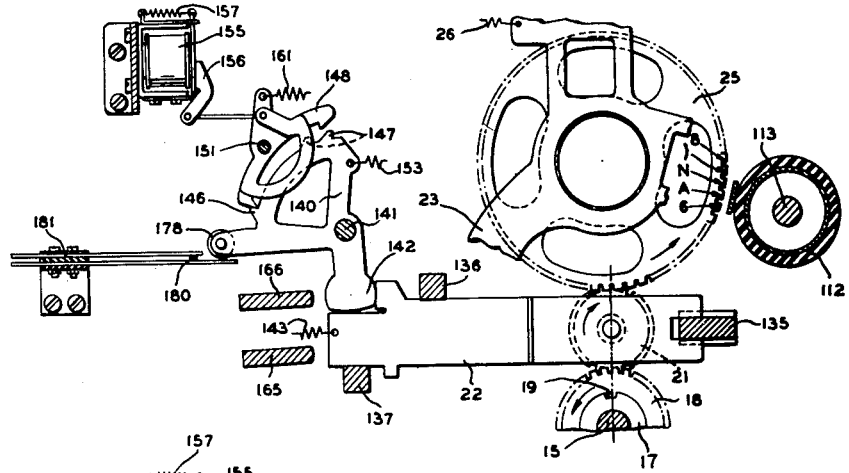
FIGS. 8, 9 and 10 are section views of the escapement controlled interposer slide each showing the mechanism in a different setting.

If the escapement magnet is now energized and held energized for a long period of time, i.e., for the major portion of the time period required by the type wheel 25 to complete one rotation, the escapement pawl 148 will be rocked counterclockwise. As the pawl moves out of engagement with the first tooth 147, it will engage the tooth 146, thus permitting the interposer member 140 to rock clockwise from the position shown in FIG. 3 to the position of FIG. 8. Accordingly, the spring urged slide 22 moves to a second position. In effect, the idler gear 21 is caused to walk one tooth on the driving gear 18 which results in momentarily decelerating the type wheel to translocate the type characters and bring the second tooth in each zone to a location that would permit printing of the character located on said second tooth, at the respective zone firing point of the print cycle. As the type wheel nears the end of a complete rotation from zero position, the bail bar 166 and bail bar 165 act to restore the slide member 22 and interposer member 140, respectively, to first position by means described above, and the escapement magnet is deenergized, thus returning all parts to the position shown in FIG. 3.

Figure 9:
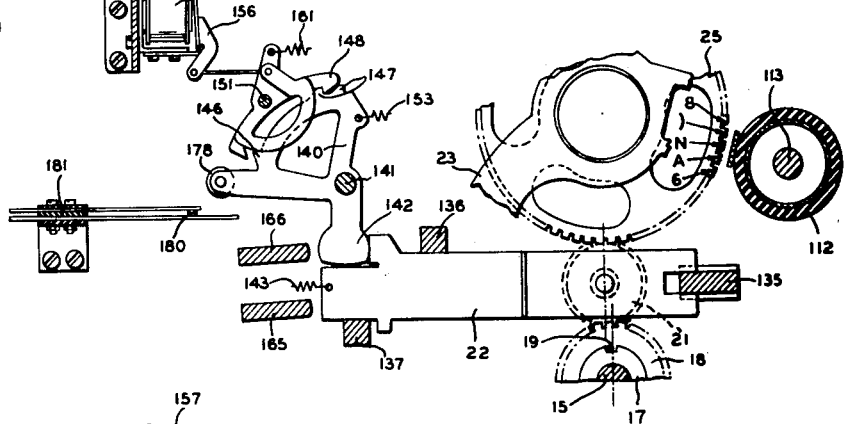

In the event the escapement magnet is now energized for a short period of time, the escapement pawl 148 will be rocked first in counterclockwise direction at the time of magnet energization and will be rocked shortly thereafter in clockwise direction at the time of magnet deenergization to the position shown in FIG. 9. The pawl 148 will engage the second tooth 147 thus positioning the interposer member 140 at its third position. Accordingly, the spring urged slide member 22 moves to third position. In effect, the idler gear 21 is caused to walk two teeth on the driving gear 18 which results in bringing the third tooth in which ever zone is in firing relation to the platen to a location that would permit printing of the character located on said third tooth.

Figure 10:
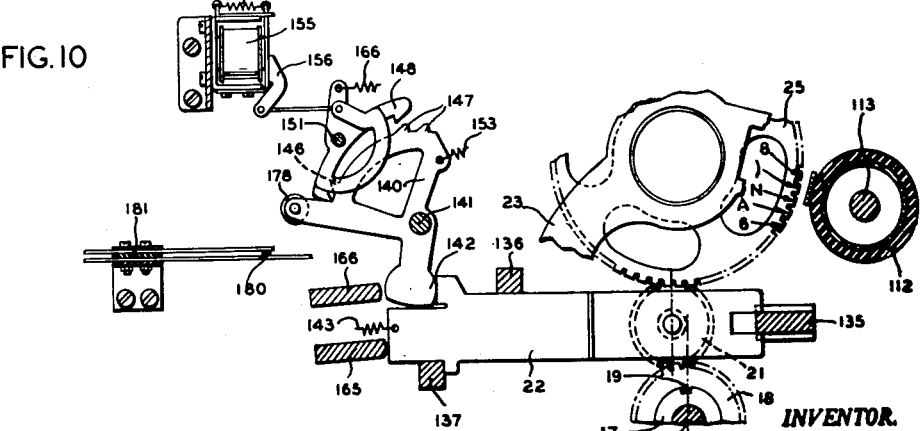

In the event the escapement magnet is energized for a short period of time, deenergized, and then energized for a long period of time, the escapement pawl 148 will be rocked first in counterclockwise direction at time of magnet energization then rocked shortly thereafter in clockwise direction at time of magnet deenergization and rocked again in counterclockwise direction at time of second magnet energization to the position shown in FIG. 10. In this final position of the interposer member 140 the spring urged slide member 22 moves to fourth position. In effect, the idler gear 21 is caused to walk three teeth on the driving gear 18 which results in bringing the fourth tooth in a zone to a location that would permit printing of the character located on said fourth tooth.

A forwardly extending arm of the interposer 140 carries a roller 178 disposed to engage the contact arm of one of a pair of contacts, hereinafter called no-print contacts 180 mounted on a cross support bar 181 secured to the frame plates 11, 12 in such position that, whenever the interposer member 140 is in the first restored position, the roller 178 will hold said no-print contacts in open circuit position. On all other positions of said interposer member, the no-print contacts 180 will be in closed circuit position. In this manner, said no-print contacts will be in open circuit position whenever the slide member 22 is in its first or restored position, and will be in closed circuit position for all other positions of said slide member.

Any suitable means may be employed for line spacing the platen 112. In the present instance a ratchet wheel 185, fast on the platen shaft 113, is operatively associated with a space lever 186 (FIG. 2), loose on said platen shaft, by means of a spring urged space pawl 187. Said space pawl is pivotally mounted on the lower end of said space lever. A spring 188 serves to maintain the space pawl in contact with the outer periphery of the ratchet wheel. A link 191 pivotally connects said lever with the interposer bail restoring lever 169. Construction is such that the restoring movement of the interposer bail lever 169, results in rotation of the platen 112 from one line to the next after printing is accomplished on each rotation of the type wheel 25.

*Control Circuit*

Figures 14, 15:
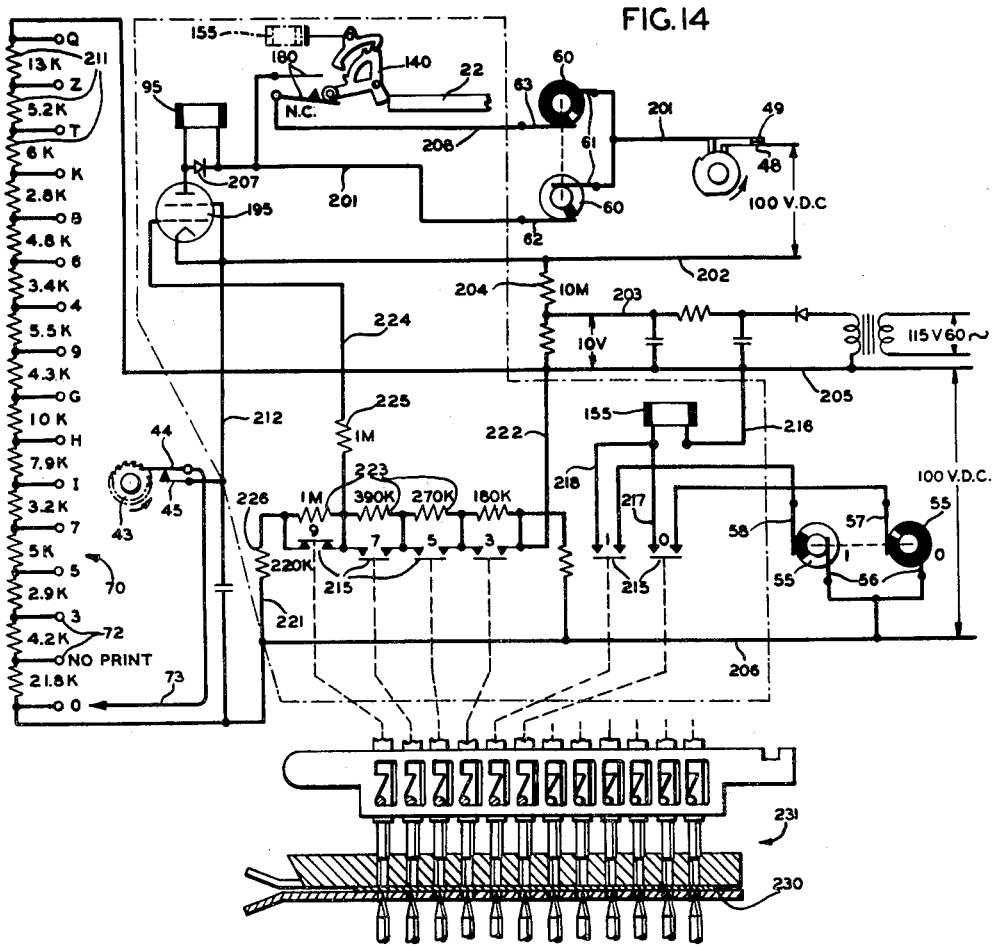
FIG. 14 is a wiring diagram of the control circuit.
FIG. 15 is a view of a tabulating punched card illustrating the alpha-numeric code for which the instant control circuit is adapted.

Control over the printing of a desired character by the type wheel 25 of the subject invention is accomplished through a control circuit in cooperation with the mechanism described hereinbefore. A wiring diagram for the control circuit is shown in FIG. 14. As noted on the diagram, certain of the components, i.e., those with phantom outline, are required to be duplicated for each type wheel, while the other components require but one for each machine.

As seen in the diagram (FIG. 14), the control circuit for each type wheel consists essentially of a gas filled thyratron vacuum tube 195, its associated power supply, grid control circuit, and cathode control circuit.

For any value of thyratron grid voltage, there is a distinct value of plate to cathode voltage (the ignition point) at which ionization of the gas contained within the tube envelope occurs and plate current flow is started. From this point on, the effect of the grid voltage in stopping current flow is negligible, the grid regaining control only when the tube discharge is extinguished long enough for deionization of the gas to take place.

A tetrode or four element thyratron is utilized in the particular circuit under discussion and, as may be seen in the diagram (FIG. 14), the fourth element or shield grid is at cathode potential. The tube is designed so as to fire when a constantly decreasing potential applied to the cathode substantially equals a selected potential applied to the grid.

Disregarding for the moment the various auxiliary contacts and similar items as seen in FIG. 14, it will be seen in the present instance that a source of D.-C. voltage, hereinafter called the plate supply, is applied through leads 201, 202 between tube cathode and anode; a second source of D.-C. voltage, hereinafter called the cathode bias supply, has one side lead 203, effectively connected through resistor 204 to the tube cathode lead 202 and the opposite side 205 forms one side of a third source of D.-C. voltage, hereinafter called the grid-cathode supply. The opposite side lead 206, of the grid-cathode supply forms the negative reference level, hereinafter called the negative bus, for the control circuit.

By connecting various resistors in combination across the grid-cathode supply, it is possible to maintain the grid at any one of several potential values. Assuming application of plate voltage to the thyratron and a given grid voltage, it is apparent that connection of the cathode to successive points in a voltage divider, also across the grid-cathode supply, will provide a stepwise decreasing potential to the cathode. At the point where cathode potential is substantially similar in value to grid potential, the thyratron will fire and plate current will flow. Regardless of subsequent change in grid-to-cathode potential, plate current will continue to flow until the plate circuit is interrupted long enough for deionization to take place.

As may be seen in the diagram (FIG. 14), the coil of the print magnet 95 is connected in the thyratron plate circuit 201. A rectifier 207, connected in parallel with the print magnet coil, improves operation of the print magnet at time of energization of the coil. Whenever plate current flows in the plate circuit, the print magnet will trip the print clutch, thus causing the type wheel carrier 23 to rock momentarily to print position, as described previously.

The no print contacts 180 through the contacts of transfer commutator 60 and lead 208 are connected in parallel with the thyratron plate lead 201. During the greater portion of a type wheel rotation the thyratron plate contact 62 is connected to the common contact 61 of the transfer commutator, thus maintaining the thyratron anode at the predetermined potential. Near the end of a type wheel rotation, said common contact is disconnected from the plate contact 62 and is connected to the transfer contact 63. Being a make before break action, the plate circuit is not broken during such transfer. In event that the no print contacts 180 are open, however, the plate circuit will be open circuited upon completion of the transfer and plate potential will be removed from the thyratron for a purpose, as explained hereinafter.

The safety contacts 48, 49 are in the thyratron anode supply lead 201 and are opened and closed very near the end of each rotation of the type wheel. In the event that the thyratron had fired during the preceding portion of the print cycle and the plate circuit had not been opened by other means normally used for that purpose, the safety contacts 48, 49 will open the plate circuit to restore normal control action of the thyratron prior to starting the next rotation of the type wheel, i.e., print cycle.

The contact arm 73 of the rotary switch 70, as mentioned previously, is driven in synchronism with the type wheel 25 and establishes contact with each of the pins 72 in succession during each rotation of said contact arm.

A series of resistors 211, one resistor being connected between adjacent ones of the pins 72, form a voltage divider, the opposite extremities of which are connected to the grid-cathode supply leads 205, 206 as seen in the diagram of FIGURE 14. It will be seen that, as the contact arm 73, establishes contact with each of the pins 72 in turn, a stepwise varying voltage will be available at said contact arm.

Normal wiping action of the contact arm 73 when leaving each of the pins 72 provides a comparatively slow break of the established circuit, which would contribute to rather ragged action of the thyratron control circuit. By making and breaking the circuit to each pin by means of the cut-off contacts 44, 45, connected in series with said contact arm, it is possible to obtain the sharp circuit operation desired for good control circuit action. The toothed wheel 43, described hereinbefore, acts to close and open the cut-off contacts 44, 45 at the proper instant, just as the contact arm 73 is wiping over each of the pins 72.

The number of resistors 211 will be equal to the number of effective printing zones in the type wheel 25, and as may be seen in the diagram, FIG. 14, the contact arm 73 is connected through contacts 44, 45 and a lead 212 to the cathode of the thyratron 195. Accordingly, as said contact arm establishes contact with succeeding pins 72, working from top to bottom as seen in FIG. 14, it is apparent that the cathode will assume a stepwise decreasing potential relative to the negative bus 206. When the contact arm 73 is on the pin labelled "Q," the cathode will be at approximately 100 volts positive potential relative to the negative bus 206, and when said arm is on the pin labelled "No Print," the cathode will be at a potential determined by the value of the lowermost resistor. The lead 203 of the cathode bias supply, being connected through resistor 204 to the cathode supply lead 202, is effective for presenting drops in cathode potential while the contact arm 73 is between the pins 72, and the contacts 44, 45 are open.

A series of sensing switches 215 is arranged to establish the thyratron control element or grid at various potential levels relative to the cathode, two additional switches 215 serving to energize the interposer magnet 155, described previously, at suitable times. The total number of sensing switches 215, corresponds to the number of index positions contained in the data representative code used in a particular application of the subject mechanism disclosed herein.

One leg of the coil of the interposer magnet 155 is connected directly by lead 216 to the positive side, lead 205, of the grid-cathode supply, while the remaining leg of the coil is connected in parallel by leads 217, 218 through the "0" and the "1" sensing switches and through their respective sections of the interposer commutator 55 to the negative bus 206 of the grid-cathode supply. It is apparent then, that the interposer magnet 155 will be energized whenever the "1" switch 215 is closed and contact is established from the common contact 56 to the "1" contact 58 of the interposer commutator 55, and whenever the "0" switch 215 is closed and contact is established from said common contact to "0" contact 57 of said interposer commutator. In the present instance, the "0" pulse of the interposer commutator will energize the interposer magnet 155 for a short period of time at a certain point during rotation of the type wheel, providing that the "0" switch 215 is closed, and the "1" pulse of the interposer commutator will energize the interposer magnet 155 for a longer period of time and at a later point of the print cycle, providing that the "1" switch 215 is closed. The "0" pulse and the "1" pulse, when applied in sequence, occur within the limits of one rotation of the type wheel, i.e., one print cycle.

All of the sensing switches 215, except the "0" and the "1" switches i.e., the "3," "5," "7," and "9" are connected in series across the grid-cathode supply by leader 221, 222. A corresponding resistor 223 is connected across each of the switch contacts. The contacts of the switch 215 labeled "9" are normally closed, while contacts of all other switches 215 in the series are normally open. A common lead 224 connects between switch "7" and switch "9" and runs to the thyratron grid through a resistor 225. In effect, the resistors 223 and switches 215 together with a resistor 226 inserted in the lead 221 form a voltage divider for establishment of the thyratron grid at various potential levels by setting the switches 223 labeled "3," "5," "7," and "9" in various combinations.

It will be apparent that it is possible to cause the thyratron to fire at any desired instant during a type wheel rotation by establishing a grid potential of a certain value and by coordinating cathode potential so that the contact arm 73 selects a proper potential value at the point in type wheel rotation at which it is desired to have the thyratron fire. In other words, the thyratron is held at a certain grid-to-negative-bus potential throughout the greater portion of the print cycle and the cathode-to-negative-bus potential is varied from a high value to a low value. At the point in the cycle at which the grid and the cathode potential coincide, the thyratron will fire, thus actuating the print magnet 95 for obtaining print clutch action to rock the type wheel 25 to print position.

For the purpose of illustration, operation of the mechanism and the control circuit herein disclosed will be described as adopted for a punched card controlled machine, such as a tabulator, and more particularly when adapted for sensing data in cards presenting such data in an expanded version of the well known Powers ninety column code.

Basicaly, the Powers ninety column code embraces card columns (see FIG. 15) having six index positions for use with a combinational code, said positions being designated from the top to bottom of a column as the "0," "1," "3," "5," "7," and "9" positions, respectively. In the basic ninety column code, numerical data is represented by either a single perforation or a combinational two-position perforation pattern which includes the "9" index position, and alphabetic data is represented by either a combinational three-position pattern, or a two-position pattern not employed in representing numerical data.

The expanded version of the ninety column code used in the specific adaptation of the invention described herein, utilizes the basic ninety column code having perforation patterns as described above for representing alphabetical and numerical data, and utilizes additional patterns including a two-position pattern not employed in the basic code, and combinational four-position and five-position patterns. In this manner, it is possible to provide a combinational pattern peculiar to each of the fifty-three characters provided on the type wheel 25 described herein. Sequential location of the various characters on the type wheel adapted for use with the particular embodiment described herein is shown in FIG. 7, while perforation patterns corresponding to each of said characters is illustrated in the card 230 shown in FIG. 15.

In the following description, the type wheel 25 is understood to move normally in counterclockwise direction, as seen in FIG. 3, and one rotation of said type wheel is considered to start when the home or 0 degree position of said type wheel passes a point directly opposite the platen, and to end when the home position has moved around to again pass this point. Each of the sensing switches 215 corresponds to the labeled index position of a card column and it is noticed that the "9" sensing switch contacts are normally closed while the contacts of all other sensing switches are normally open. Any suitable sensing mechanism 231, as shown in FIG. 14, may be provided for actuation of the sensing switches 215 according to perforation patterns sensed in the card column corresponding to a given type wheel. As mentioned previously, the number of type wheels employed in a given machine will correspond to the number of columns contained in the record card associated therewith.

A record card will be fed into the sensing chamber near the middle of a given print cycle and the sensing mechanism will actuate said sensing switches in combinational pattern according to the pattern sensed in the associated card column near the end of that print cycle, which is to say, as the type wheel home position near the platen.

In the present instance, the rotary switch 70 is provided with sixteen pins 72 with one pin not used. The remaining fifteen pins are connected in sequence and are labeled to correspond to the character occupying the first tooth in each zone of the type wheel 25, except the last zone in normal wheel rotation. Said last zone is unusuable for printing purposes as its interval of travel provides opportunity for setting up the sensing switches 215 in combinational pattern for selection of the character to be printed during the next rotation of the type wheel. For this reason the sixteenth pin 72 of the commutator is unused and the corresponding tooth of the toothed wheel 43 is of double length, as it is unnecessary to fire the thyratron during this interval of type wheel rotation.

Considering the power supplies of the control circuit in operation, the type wheel 25 in counterclockwise motion with the sensing or last zone passing the platen 112, and the sensing switches 215 activated according to sensing of the perforation pattern for the character "Q" in the corresponding card column, it is apparent that the thyratron grid potential will be at its maximum value relative to the negative bus 206. As may be seen in FIG. 15, the "Q" pattern consists of a "3," "5," and "7" perforation, sensing of which will actuate corresponding ones of the sensing switches 215. Thus the thyratron grid lead will be, in effect, connected directly to the maximum potential of the grid-cathode supply. Due to absence of a "0" or a "1" perforation in the "Q" pattern, the interposer magnet 155 will be in deenergized condition and the slide member 22 will be in its first position.

At the instant that the home position of the type wheel, which is the dividing line between the sensing zone and the "Q" zone, passes the platen, the no-print contacts 180 will be open (slide member in first position), the thyratron plate contact 62 is connected to the common contact 61 of the transfer commutator 60, thus rendering said no-print contacts ineffective at this time, and placing plate potential on the thyratron anode.

As the "Q" tooth of the type wheel approaches a position opposite the platen, the contact arm 73 completes the circuit to the "Q" pin of the commutator 70. At this instant the cut-off contacts 45, 44 are closed and the cathode is, therefore, placed at a potential level substantially identical to that of the grid. Thus the thyratron fires at this instant and plate current starts to flow in the thyratron plate circuit. Such current flow through the print clutch magnet 95 causes the magnet to be energized and causes the print clutch to step from one lobe of the cam ring 77 to the next, as described previously. This action causes the type wheel carrier 23 to rock rearward, to print position, against the platen which action imparts to the type wheel 25 a momentary counter rotative thrust sufficient in magnitude to cause the rotation of said type wheel to stop just as the "Q" tooth passes the platen. The angular clearance between the driving gear 18 and keyway in the hub sleeve 17, described previously, allows sufficient backlash in the gear train, so that the type wheel may remain momentarily stopped when against the platen, even though the main drive shaft 15 is driven at a constant rate.

After printing, continuous motion of the main drive shaft takes up the backlash, and the type wheel 25 accelerates to its normal speed as the carrier arm 23 returns to its normal non-print position. The type wheel continues in normal rotation until the character "3" passes the platen. At this time, the transfer commutator 60 acts to disconnect the common contact 61 from the plate contact 62 and to connect said common contact to the transfer contact 63 by the make before break action described previously. Since the no-print contacts 180 are open, this action interrupts the thyratron plate circuit and thereby extinguishes the thyratron. In this manner, control of the thyratron is regained by the grid-cathode potential. As the last character on the type wheel 25 passes the platen, the transfer commutator 60 returns to normal condition, whereat the common contact 61 is connected to the plate contact 62. Immediately thereafter the safety contacts 48, 49 are momentarily opened for further assurance of thyratron extinguishment prior to the start of the next print cycle.

It is apparent that sensing of any other perforation pattern corresponding to a character of the first tooth of the type wheel zones will set up a corresponding grid potential of the thyratron. Motion of the contact arm 73 will cause the thyratron to fire when contact is made with the pin 72 providing a cathode potential identical to the grid potential, which is to say, when the character sensed is passing the platen 112. Thyratron plate current flow obtains printing action, as described in the foregoing, for activating the print clutch and moving the carrier arm to print position at the desired instant. It will be realized that restoring movement of the bail bars 165 and 166 is an idle motion whenever the slide member 22 is maintained in its first position during a print cycle.

In the event a blank card column is encountered, the "9" sensing switch contacts 215 will be closed and all remaining sensing switches will be open, thus establishing the grid at its lowest potential relative to the negative bus. The type wheel will rotate in normal counterclockwise direction until the "3" character passes the platen, at which time the common contact 61 of the transfer commutator 60 is disconnected from the plate contact 62 and is connected to the transfer contact 63. As there is neither a "0" nor a "1" perforation in the blank column, the slide member 22 is in its first position and the no-print contacts 180 are open. Thus, action of the transfer commutator as mentioned above, breaks the thyratron plate circuit, the thyratron is unable to fire, and the "blank" tooth of the type wheel, which is the first tooth in the last print zone, passes the platen in idle motion. In this manner, a blank card column will result in a blank on the register sheet.

Sensing of a data representative pattern having a perforation in the "1" index position will cause the interposer magnet 155 to be energized when the circuit is completed from the common contact 56 to the "1" contact 58 of the interposer commutator 55. Considering said escapement commutator as moving in synchronism with the type wheen 25 and the commutator zero degree position as coinciding with the home position of said type wheel, the interposer magnet 155 will be energized at approximately thirty degrees of type wheel rotation, and will be held in energized condition until 337.5 degrees of type wheel rotation. As described previously, energization of said escapement magnet for a long period of time results in a one stop clockwise movement of the interposer 140. This action results in movement of the slide member 22 from first position to second position, and said slide member will maintain this position as long as the escapement magnet is held in energized condition. With the slide member 22 in second position, the type wheel is retarded one tooth in timed operation relative to movement of the contact arm 73 of the commutator 70. It is apparent that firing of the thyratron at the time of engagement of said contact arm with a given pin 72 will cause printing of the character located on the second tooth in the zone of the type wheel corresponding to the given pin.

Considering the sensing switches 215 set responsive to sensing of the perforation pattern for the character "—" (dash) in the corresponding card column, it is apparent that the thyratron grid potential will be at an intermediate value as determined by effective ones of the grid resistors 223. As may be seen in FIG. 15, the "—" pattern consists of a "1," "3," "7," and "9" perforation, sensing of which will actuate corresponding ones of the sensing switches 215. In this manner, the thyratron grid will be established at an intermediate potential level determined by the effective "5" resistor, "9" resistor, and resistor 226.

Sensing of the "1" perforation permits the interposer magnet to be energized at thirty degrees of travel of the type wheel, with resulting movement of the slide member 22 to its second position and the no-print contacts 180 will be in closed position. It will be seen in FIG. 15 that the grid resistor set-up for the "—" pattern is identical to the set-up for the "T" pattern, therefore, the thyratron will fire when the contact arm 73 completes the circuit to the "T" pin of the commutator 70. Since the slide member is in second position, however, resulting movement of the carrier arm 23 to printing position will occur when the second tooth of the "T" zone of the type wheel 25 is passing the platen 112. In this manner, said type wheel is caused to print the "—" character.

At 337.5 degrees of rotation on the same revolution of the type wheel, the interposer commutator 55 breaks the circuit to the "1" contact 215 and the interposer magnet 155 is deenergized at this time. Shortly thereafter the bail bar 166 moves to restore the interposer member 140 to its first position, and, at the same time, the bail bar 165 moves to restore the slide member 22 to its first position.

It is apparent that make before break action of the transfer commutator 60 late in type wheel rotation will not interrupt the plate circuit as the no-print contacts 180 are in closed position due to the slide member 22 being in its second position. Shortly thereafter, said transfer commutator returns to normal condition. The plate circuit will be interrupted at this time and will thereby extinguish the thyratron.

The perforation pattern for the second character of a zone then will have a "1" perforation in addition to the pattern representing the first character in the same zone. In effect, the thyratron fires at the same instant of the cycle as it would for the first character of the zone, but the type wheel is being driven one tooth in delay of normal timing so that the second character of the selected zone is printed.

Sensing of the perforation pattern for the numeral "1" as seen in FIG. 15, results in actuation of the "1" sensing switch 215 only. Thus the thyratron grid will be at its lowest potential level, determined by the effective "3," "5," and "7" grid resistors 223, ("9" sensing switch normally closed, and resistor 226, which is to say, the grid is established at the level for printing in the no-print zone of the type wheel. Sensing of the "1" perforation energizes the interposer magnet 155 for a long pulse, resulting in movement of the slide member 22 to its second position. The thyratron cathode potential level will equal the grid potential when the contact arm 73 completes the circuit to the no-print pin 72 of the commutator 70. Since the slide member 22 is in a position other than its first position, namely, its second position, the no-print contacts 180 are closed. Thus the make before break action of the transfer commutator 60 will not interrupt the plate potential, and the thyratron will fire at the instant associated with the first tooth, which is blank, of the no-print zone, but the type wheel is being driven one tooth in delay of normal timing so that the second character of the no-print zone is printed, this being the numeral "1" in the present instance.

Sensing of the perforation pattern for the character "/" (virgule) as seen in FIG. 15, results in actuation of the "0," "3," "7," and "9" sensing switches 215. Thus the thyratron grid will be at an intermediate potential level, determined by the effective "5' resistor, "9" resistor, and resistor 226. Sensing of the "0" perforation permits the interposer magnet to be energized at about zero degree of the print cycle, and to be held in energized condition until about 22.5 degrees of the print cycle. As described previously, energization of said escapement magnet for a short period of time results in a two step clockwise movement of the interposer member 140, thus positioning the interposer member at its third position. Accordingly, the slide member 22 moves to its third position. With said slide member in third position the no-print contacts 180 are in closed position, and the type wheel 25 is retarded two teeth in timed operation relative to movement of the contact arm 73 of the commutator 70. It will be seen that the grid resistor set-up in the "/" pattern is identical to the set-up for the "T" pattern, therefore the thyratron will fire when the contact arm 73 completes the circuit to the "T" pin of the commutator 70. Since the slide member 22 is in its third position, resulting movement of the carrier arm 23 to printing position will occur when the third tooth of the "T" zone of the type wheel 25 is passing the platen 112. In this manner, said type wheel is caused to print the "/" character.

Near the end of the type wheel rotation being considered, the interposer member 140 and slide member 22 are restored to first position by action of the respective bail bar 166 and bail bar 165, and the thyratron is extinguished upon return of the transfer commutator 60 to normal condition, as described previously.

The perforation pattern for the third character of a zone, then, will have a "0" perforation in addition to the pattern representing the first character in the same zone. In effect, the thyratron fires at the same instant as it would for the first character of the zone, but the type wheel is being driven two teeth in delay of normal timing so that the third character of the selected zone is printed.

Sensing of the perforation pattern for the character "@," as seen in FIG. 15, results in actuation of the "0," "1," "3," "7," and "9" sensing switches 215. Thus the thyratron grid will be at an intermediate potential level, determined by the effective "5" resistor, and resistor 226. Sensing of the "0" perforation results in energization of the interposer magnet 155 during the period from 0 degrees to 22.5 degrees of type wheel rotation. Sensing of the "1" perforation results in energization of said escapement magnet during the period from thirty degrees to 337.5 degrees of type wheel rotation. As described previously, if the interposer magnet 155 is energized for a short period of time, is deenergized, and then is energized for a long period of time, the interposer member 140 will be positioned at its fourth position, with consequent movement of the slide member 22 to its fourth position. Accordingly, whenever a "0" perforation and a "1" perforation are sensed in the same data representation pattern, the slide member will be in its fourth position after the first thirty degrees of type wheel rotation.

In the case of sensing the character "@," then, the type wheel is delayed three teeth in timed operation relative to the movement of the contact arm 73 of the commutator 70. It will be seen that the grid resistor setup for the "@" pattern is identical to the set-up for the "T" pattern, therefore, the thyratron will fire when the contact arm 73 completes the circuit to the "T" pin of the commutator 70. Since the slide member 22 will be in fourth position, however, movement of the type wheel to printing position will occur when the fourth tooth of the "T" zone is passing the platen 112. In this manner, said type wheel is caused to print the "@" character.

The interposer member 140 and slide member 22 are restored to first position by action of the respective bail bars 166 and 165, and the thyratron is extinguished upon return of the transfer commutator 60 to normal condition, as described previously.

The perforation pattern for the fourth character of a zone, then, will have a "0" perforation and a "1" perforation in addition to the pattern representing the first character in the same zone. The thyratron fires at the instant associated with the first character of the zone, but the type wheel is being driven three teeth in advance of normal timing so that the fourth character of the selected zone is printed.

While I have described what I consider to be a highly desirable embodiment of my invention, it is obvious that many changes in form could be made without departing from the spirit of my invention, and I, therefore, do not limit myself to the exact form herein shown and described, nor to anything less than the whole of my invention as hereinbefore set forth, and as hereinafter claimed.

What I claim as new and desire to secure by Letters Patent is:

1. In a machine of the class described having continuously rotating driving means and a member to be rotatably driven momentarily at selected times by said driving means, a clutch mechanism operatively connecting said driving means with said member and comprising a toothed wheel integrally secured to said driving means and disposed within the plane of and coaxially with respect to said driven member to provide a bearing support for said driven member, means pivotally mounted on said driven member and engageable with a tooth of said wheel for transmitting the driving force of said wheel to said member, means supported by said driven member for camming said pivotally mounted means into and out of effective driving engagement with said wheel, said camming means being yieldably urged relative to said driven member in a direction to render said pivotally mounted means effective, and blocking means disposed for engagement with said camming means and effective for displacing said camming means in the opposite direction with respect to said driven member, the said camming means when so displaced by said blocking means operating to cam said pivotally mounted means out of effective driving engagement.

2. In a machine of the class described having continuously rotating driving means, and a member to be rotatably driven momentarily at selected times by said driving means, a clutch mechanism operatively connecting said driving means with said driven member and comprising a toothed wheel integrally secured to said driving means and disposed within the plane of and coaxially with said driven member to provide a bearing support for said driven member, pawl means mounted on said driven member and engageable with said wheel for transmitting the driving force of said wheel to said member, pawl actuating means supported by said driven member and rotatably displaceable with respect to said driven member for camming said pawl means into and out of effective driving engagement with said wheel, said actuating means being yieldably urged relative to said driven member in a direction to render said pawl means effective and positively displaceable in the opposite direction for rendering said pawl means ineffective, and blocking means for effecting the said positive displacement of said pawl actuating means, said blocking means including an arm movable into engagement with said actuating means, said arm when engaging said actuating means during the rotation of said driven member effecting the said positive displacement of said actuating means to render said pawl means ineffective.

3. In a machine of the class described having continuously operating driving means including a drive shaft with drive teeth arranged peripherally thereon, and a rotatable member supported by said teeth and coaxial with said shaft to be driven a predetermined extent at selected times by said driving means, a clutch mechanism operatively connecting said driving means with said driven member comprising pawl means mounted on said driven member and engageable with said teeth for transmitting the driving force on said driving means to said driven member, pawl actuating means supported by said member for camming engagement with said pawl means and rotatably displaceable with respect to said member, said actuating means being yieldably urged in a direction to render said pawl means effective and positively displaceable in the opposite direction for rendering said pawl means ineffective, and blocking means for retaining said actuating means in positively displaced relation to said driven member, said blocking means including a first holding member engageable with said driven member and a second holding member engageable with said actuating means, said second mentioned holding member being movable to ineffective holding position at a selected time during the rotation of said driving means enabling said actuating means to render said pawl means effective, said second mentioned holding member being returned by said actuating means to effective holding position during the rotation of said driven member to cause said positive displacement of said actuating means with respect to said driven member, said first mentioned holding member being arranged to engage said driven member upon said driven member completing said predetermined extent of movement.

4. In a machine of the class described having continuously operating driving means including a drive shaft with drive teeth arranged peripherally thereon, and a rotatable member supported by said teeth and coaxial with said shaft to be driven a predetermined extent of movement at selected times by said driving means, a clutch mechanism operatively connecting said driving means with said driven member comprising pawl means pivoted to said driven member and engageable with said teeth for transmitting the driving force of said driving means to said driven member, said pawl means being formed with camming shoulders disposed oppositely of the pivotal axis thereof, pawl actuating means supported by said member for limited movement relative to said driven member and having camming lobes cooperating with said shoulders, spring means connecting said actuating means with said member, said spring means urging said actuating means in the direction of rotation of said member to cam said pawl means into effective driving engagement, and blocking means for positively displacing and holding displaced said actuating means in the opposite direction against the action of said spring means to render said pawl means ineffective, said blocking means including a first holding member engageable with said driven member and a second holding member engageable with said actuating means, said second mentioned holding member being movable to ineffective holding position at a selected time during the rotation of said driving means enabling said actuating means to render said pawl means effective, said second mentioned holding member being returned by said actuating means to effective holding position during the rotation of said driven member for positively displacing said actuating means to render said pawl means ineffective, said first mentioned holding member being arranged to engage said driven member upon said driven member completing said predetermined extent of movement.

References Cited in the file of this patent

UNITED STATES PATENTS

| | | |
|---|---|---|
| 1,987,742 | Lawrence | Jan. 15, 1935 |
| 2,136,541 | Carson | Nov. 15, 1938 |
| 2,566,540 | Steed | Sept. 4, 1951 |
| 2,658,599 | Luhn | Nov. 10, 1953 |
| 2,858,388 | Eastman | Oct. 28, 1958 |

FOREIGN PATENTS

| | | |
|---|---|---|
| 666,604 | France | May 27, 1929 |
| 626,497 | Great Britain | July 15, 1949 |